(12) United States Patent
Abe (10) Patent No.: US 9,531,941 B2
(45) Date of Patent: Dec. 27, 2016

(54) IMAGING APPARATUS (71) Applicant: CANON KABUSHIKI KAISHA, Tokyo (JP)

(72) Inventor: Hiroshi Abe, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/597,930

(22) Filed: Jan. 15, 2015

(65) Prior Publication Data

US 2015/0207980 A1   Jul. 23, 2015

(30) Foreign Application Priority Data

Jan. 21, 2014 (JP) .................. 2014-008571

(51) Int. Cl.
*H04N 5/222* (2006.01)
*H04N 5/232* (2006.01)
*G03B 13/36* (2006.01)
*G02B 27/00* (2006.01)

(52) U.S. Cl.
CPC .......... *H04N 5/23212* (2013.01); *G02B 27/00* (2013.01); *G03B 13/36* (2013.01)

(58) Field of Classification Search
CPC ............ H04N 5/23212; H04N 5/23293; H04N 5/23219; H04N 1/2112; H04N 1/0044; H04N 5/23216; H04N 21/44008; H04N 5/232; G03B 13/36; G03B 13/32; G02B 7/36; G06F 3/0481
USPC .......................... 348/222.1, 333.1, 345, 353
See application file for complete search history.

(56) References Cited

U.S. PATENT DOCUMENTS

| 8,049,801 B2* | 11/2011 | Kusaka ............... G02B 7/36 257/291 |
| 8,164,681 B2* | 4/2012 | Matsuno ............. G03B 7/28 348/345 |
| 2004/0151487 A1* | 8/2004 | Iwasaki ............... G03B 7/16 396/182 |
| 2008/0283724 A1* | 11/2008 | Goto ................. G02B 7/346 250/201.6 |

FOREIGN PATENT DOCUMENTS

JP    2006322970 A    11/2006

* cited by examiner

*Primary Examiner* — Trung Diep
(74) *Attorney, Agent, or Firm* — Canon U.S.A., Inc. IP Division (57) ABSTRACT

A focus detection apparatus of an imaging apparatus includes an imaging optical system for forming a plurality of optical images with divided light fluxes that have passed through an imaging lens, on a plurality of photoelectric conversion elements. A viewing field mask is disposed more on a side of the photoelectric conversion elements than an expected imaging surface of an imaging lens, and determines contours of the optical images formed on a detection plane. A focus detection element includes focus detection regions each for detecting an optical image. A termination pixel disposed outside an optical image and a termination pixel disposed inside the optical image are provided in each of the focus detection regions. A control unit obtains data of adjustment values indicating effective ranges of the focus detection regions from a storage unit, performs focus detection for the imaging lens, and controls a focus adjustment operation.

10 Claims, 8 Drawing Sheets

IMAGING APPARATUS

BACKGROUND OF THE INVENTION

Field of the Invention

The present invention relates to a focus detection apparatus of an imaging apparatus, and particularly to a positional relation between a photoelectric conversion element for detecting information about a focusing state and optical images formed on the photoelectric conversion element.

Description of the Related Art

With the increase in the use of imaging apparatuses represented by digital cameras and video cameras, demands for higher definition and downsizing of imaging apparatuses are steadily increasing. In particular, an increase in field of view and downsizing are demanded for a focus detection apparatus for detecting a focusing state of an imaging lens of an imaging apparatus. A focus detection apparatus employing the Through-The-Lens (TTL) phase difference system forms a plurality of optical images with a plurality of light fluxes that passed through a plurality of division regions of an exit pupil of an imaging lens, and detects a focusing state of the imaging lens based on a relative positional relation between the plurality of optical images.

In the above-described focus detection apparatus, a photoelectric conversion element for detecting information about the focusing state detects light in a wide range of a shooting region. This enables focus detection over a wide range. The size of an optical image on the photoelectric conversion element is determined by the size of a viewing field mask for limiting a light flux entering a focus detection optical system, and the magnification of a secondary imaging lens for forming an optical image on the photoelectric conversion element. In a focus detection optical system having a large viewing field mask and a small secondary image forming magnification, the photoelectric conversion element can detect light in a wide range of the shooting region. However, with an increase in size of an optical element for guiding a light flux in a wide range to the photoelectric conversion element in the focus detection optical system or in size of the housing of the focus detection optical system, an increase in size of the focus detection apparatus may result. Further, a decrease in magnification of the secondary imaging lens degrades the sensitivity of the focus detection apparatus to fluctuation of a relative positional relation between subject images on the photoelectric conversion element plane with respect to defocusing. Thus, the focus detection accuracy decreases. Japanese Patent Application Laid-Open No. 2006-322970 discusses a method for shortening the distance between a pair of optical images formed on a photoelectric conversion element is used for downsizing of a focus detection apparatus. However, if adjacent optical images are overlapped with each other, the adjacent optical images cause noise resulting in degraded focus detection accuracy.

As described above, three elements "wide field of view", "high accuracy", and "small size" are in a trade-off relation on a principle basis. A focus detection apparatus having a suitable balance between the three elements is demanded.

A focus detection apparatus discussed in Japanese Patent Application Laid-Open No. 2006-322970 achieves both an increase in width of field of view and downsizing. More specifically, the shape of the viewing field mask is designed in such a manner that an overlapped region is not formed between optical images on a photoelectric conversion element, and further an imaging region is not provided in a region where optical images are close to each other. However, shortening the distance between optical images degrades the sensitivity of the focus detection apparatus to fluctuation of a relative positional relation between subject images on the photoelectric conversion element plane with respect to defocusing. Thus, detection accuracy degradation may result.

The present invention is directed to providing a focus detection apparatus capable of performing focus detection in a wide field of view while avoiding detection accuracy degradation and size increase.

SUMMARY OF THE INVENTION

According to an aspect of the present invention, an imaging apparatus includes a focus detection apparatus for forming, through optical members, a plurality of optical images with a plurality of divided light fluxes that has passed through an imaging optical system, performing photoelectric conversion on each of the optical images, and performing focus detection for the imaging optical system. The focus detection apparatus includes a viewing field mask configured to determine contours of a plurality of optical images to be formed, a focus detection element including a plurality of focus detection regions each for detecting different one of the plurality of optical images, a storage unit configured to store data indicating positions of effective ranges in the plurality of focus detection regions as adjustment values, and a control unit configured to, based on adjustment values obtained from the storage unit, detect a focusing state of the imaging optical system from signals detected in the plurality of focus detection regions by the focus detection element, and control focus adjustment. Each of the plurality of focus detection regions includes a termination pixel located outside an optical image to be detected and a termination pixel located inside the optical image to be detected.

Further features of the present invention will become apparent from the following description of exemplary embodiments with reference to the attached drawings.

DESCRIPTION OF THE EMBODIMENTS

Each embodiment of the present invention will be described below with reference to the accompanying drawings.

Figure 1:
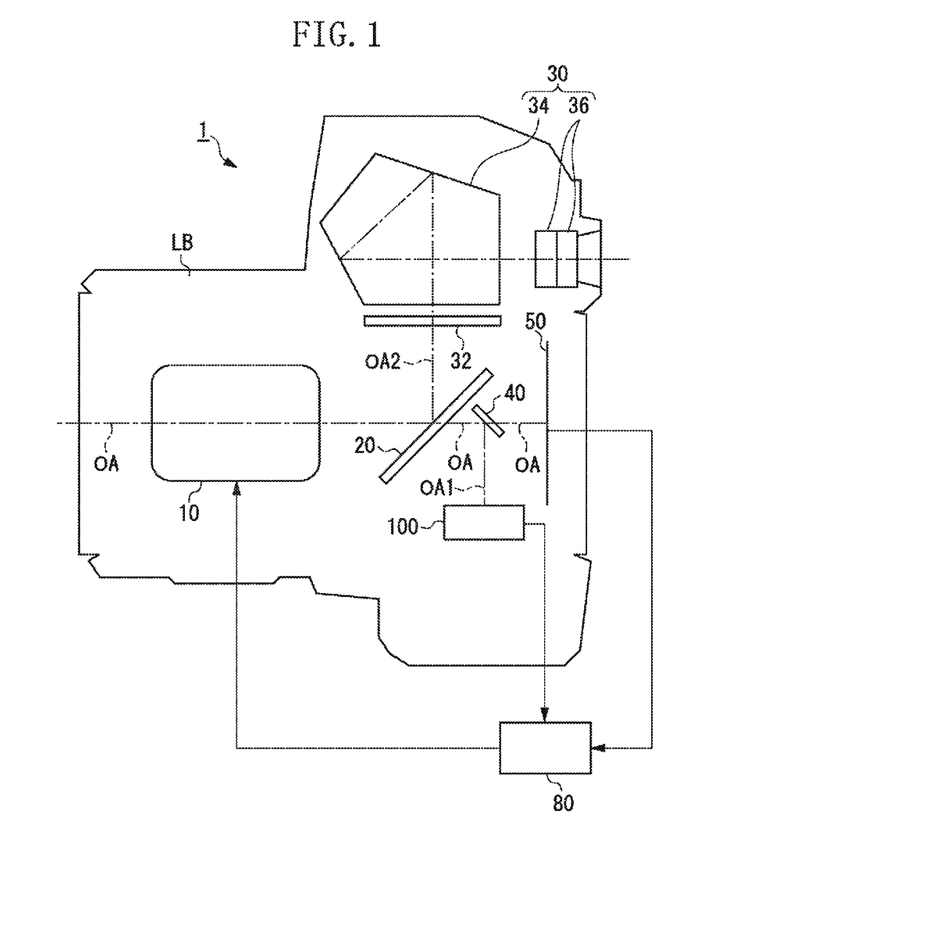
FIG. 1 a schematic diagram illustrating an example of a configuration of an imaging apparatus common to exemplary embodiments of the present invention.

An imaging apparatus 1 including a focus detection apparatus 100 according to a first exemplary embodiment of the present invention will be described below with reference to FIG. 1. FIG. 1 is a schematic diagram illustrating a configuration of the imaging apparatus 1 according to the present exemplary embodiment.

The imaging apparatus 1, for example, a single-lens reflex camera, includes an imaging lens 10 and a camera main unit. The camera main unit is configured in such a manner that the imaging lens 10 can be attached via a mounting unit (not illustrated). The imaging lens 10, an exchangeable type lens apparatus for capturing an image of a subject, includes an imaging optical system having a focus lens (not illustrated). In the imaging lens 10, driving of movable optical members of the imaging optical system is controlled by a control unit 80 in the camera main unit. For example, the control unit 80 performs drive control of the focus lens according to a result of focus detection processing by the focus detection apparatus 100 to adjust the focusing state of the imaging optical system. The imaging lens 10 is supported movably in the direction of an optical axis OA of the imaging optical system by a lens mirror barrel LB. The imaging lens 10 and the camera main unit are configured as separate components. A user can detach the imaging lens 10 from the camera main unit. Although the imaging lens 10 is not a component of the camera main unit, the imaging lens 10 needs to be attached to the camera main unit when the focus detection apparatus 100 performs focus detection. Therefore, the imaging lens 10 will be handled as a component of the imaging apparatus 1.

The camera main unit includes a main mirror 20, a finder optical system 30, and a sub mirror 40. The main mirror 20 is configured as a half mirror having semi-permeability, or a movable mirror partly having a half mirror surface. The main mirror 20 reflects a part of light that has passed through the imaging lens 10, and guides the reflected light to the finder optical system 30 along an optical axis OA2. A part of the light that has passed through the imaging lens 10 penetrates the main mirror 20. The transmitted light is guided to the sub mirror 40 along the optical axis OA.

The finder optical system 30 is an optical system used by the user to observe a subject. In other words, the finder optical system 30 presents to the user an image for observation equivalent to a subject image to be captured. The finder optical system 30 includes a focal plane plate 32, a penta prism 34, and an eyepiece lens 36. After reflecting on the main mirror 20, the light travels along the optical axis OA2 and is condensed in the vicinity of the focal plane plate 32. The focal plane plate 32 is provided with a matt surface and a Fresnel surface on which a finder view is formed. The focal plane plate 32 further diffuses subject light and emits the diffused light to the penta prism 34. In the penta prism 34 as an optical path conversion element, a plurality of planes reflects the light diffused by the focal plane plate 32 to guide the reflected light to the eyepiece lens 36. The eyepiece lens is also referred to as an eyepiece. Through the eyepiece lens 36, the user can observe the finder view formed on the focal plane plate 32.

The sub mirror 40 is disposed at a posterior position of the main mirror 20 in the optical axis OA direction (disposed on the imaging plane side). The sub mirror 40 reflects the light (transmitted light) that penetrated the main mirror 20, and guides the reflected light to the focus detection apparatus 100 along an optical axis OA1. The optical axis OA1 is an optical axis deflected from the optical axis OA by the sub mirror 40. The sub mirror 40 is a movable optical member which can be inserted into and removed from an imaging optical path along the optical axis OA. The sub mirror 40 is disposed at a predetermined position on the imaging optical path (optical axis OA) during observation through the finder, and is retracted to the outside of the imaging optical path during image capturing.

An imaging sensor 50 is an image pickup element having a pixel array formed of a plurality of regularly arranged pixels. The imaging sensor 50 performs photoelectric conversion on optical images formed by the imaging optical system of the imaging lens 10, i.e., subject images formed on the imaging plane, and outputs image signals. For example, the imaging sensor 50 is configured as a (two-dimensional) area sensor which performs photoelectric conversion on optical images formed on a light receiving surface on a pixel basis, accumulates electric charges according to the quantity of received light, and reads the electric charges. For example, a complementary metal-oxide semiconductor (CMOS) image sensor, a charge-coupled device (CCD) image sensor, etc. are used as the image sensor 50. The image signals output from the imaging sensor 50 undergo predetermined processing by an image processing circuit (not illustrated) to become image data, which is then converted into image data for recording. The image data obtained after conversion is recorded on a recording media, such as a semiconductor memory, an optical disk, and a magnetic tape.

The control unit 80 includes, for example, a central processing unit (CPU). A storage unit of the CPU stores various data. For example, the storage unit stores data for indicating effective ranges of focus detection regions 114A and 114B included in a focus detection element 114 in the focus detection apparatus 100 (described below), as adjustment values. The control unit 80 function as a focus detection unit for detecting a focusing state of the imaging lens 10 based on the adjustment values obtained from the storage unit. Although, according to the present exemplary embodiment, the control unit 80 includes a storage unit, an external storage device may be used.

The focus detection apparatus 100 detects a focusing state of the imaging lens 10 by using the TTL phase difference system. The focus detection apparatus 100 divides a light flux that has passed through different exit pupils of the imaging lens 10 and has reflected on the sub mirror 40 into a plurality of light fluxes to form a plurality of images with the division light fluxes, and detects a focusing state of the imaging lens 10 according to a relative positional relation between the plurality of images. More specifically, a focusing state of the imaging lens 10 can be detected based on signals obtained by performing photoelectric conversion on a plurality of pairs of images by using detection elements. The focus detection apparatus 100 outputs a focus detection signal having focusing state detection information to the control unit 80.

Figure 2:
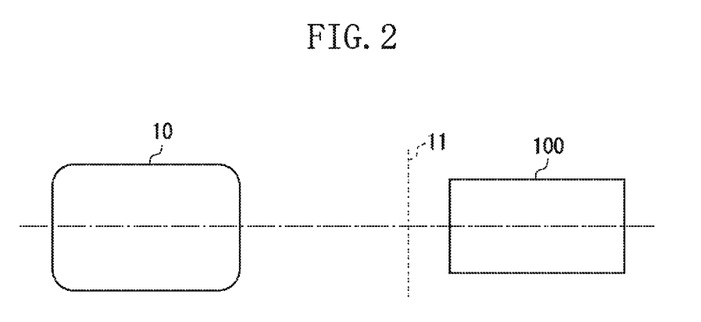
FIG. 2 is a schematic diagram illustrating positional relations between an imaging lens, an expected imaging surface, and a focus detection apparatus according to the exemplary embodiments of the present invention.

FIG. 2 is a schematic diagram illustrating positional relations between the imaging lens 10, an expected imaging surface 11, and the focus detection apparatus 100 according to the present exemplary embodiment. FIG. 2 illustrates positional relations between the imaging lens 10, the expected imaging surface 11, and the focus detection apparatus 100 in a state where the optical axis OA and a reflected light axis OA1 of the sub mirror 40 are illustrated in a linear way. The expected imaging surface is an image plane optically equivalent to the light receiving surface of the imaging sensor 50. Because of the layout of the camera main unit, the focus detection apparatus 100 is generally disposed at a posterior position of the expected imaging surface 11 (disposed on the side apart from the sub mirror 40).

Figure 3A:
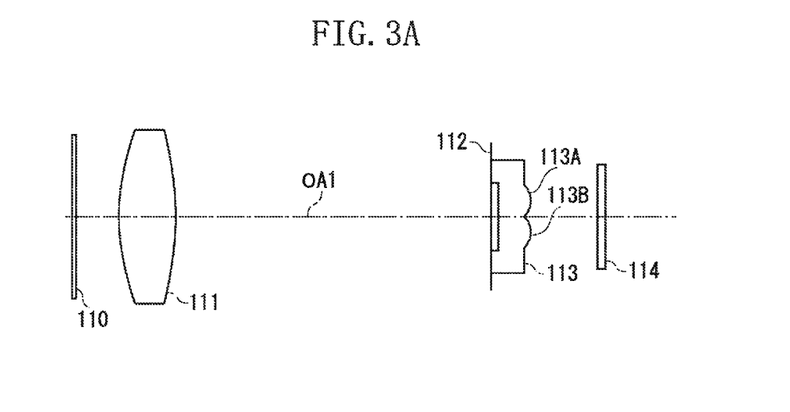
FIG. 3A is a detail view illustrating the focus detection apparatus.

FIG. 3A is a detail view illustrating a configuration of the focus detection apparatus 100 according to the present exemplary embodiment. The focus detection apparatus 100 includes a viewing field mask 110, a field lens 111, a multi-aperture stop 112, an image reforming lens unit 113, and a focus detection element (sensor) 114 sequentially disposed from the front side (the left-hand side in FIG. 3A) along the optical axis OA1. The focus detection element 114 including a photoelectric conversion element is, for example, a CMOS sensor.

Figure 3B:
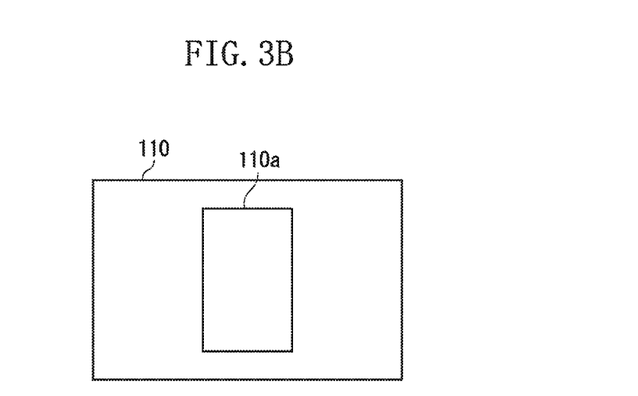
FIG. 3B is a schematic plan view illustrating a viewing field mask, according to the exemplary embodiments of the present invention.

FIG. 3B is a schematic plan view illustrating the viewing field mask 110 in the focus detection apparatus 100. The viewing field mask 110 has a rectangular opening portion 110a at the center to limit the light flux that passed through the imaging lens 10. As illustrated in FIG. 2, the focus detection apparatus 100 is disposed at a posterior position of the expected imaging surface 11 of the imaging lens 10 (on the right-hand side in FIG. 2). Therefore, the viewing field mask 110 is also disposed at a posterior position of the expected imaging surface 11. Accordingly, the contours of optical images (projection images using the viewing field mask 110) formed on the focus detection element 114 will have a defocused region.

The field lens 111 is disposed at a posterior position of the viewing field mask 110 in the optical axis OA1 direction. The field lens 111 has a lens portion corresponding to the opening portion 110a of the viewing field mask 110. The multi-aperture stop 112, made of a thin plate, is disposed at a posterior position of the field lens 111 in the optical axis OA1 direction. The multi-aperture stop 112 is disposed adjacent to the image reforming lens unit 113.

The image reforming lens unit 113 has a plurality of lens portions 113A and 113B corresponding to a plurality of pairs of opening portions in the multi-aperture stop 112. The image reforming lens unit 113 forms a subject image formed on the expected imaging surface 11 by the imaging lens 10, on a plurality of pairs of element arrays of the focus detection element 114. The focus detection element 114 is disposed at a posterior position of the image reforming lens unit 113 in the optical axis OA1 direction (on the right-hand side in FIG. 3A). In each pair of element arrays, a plurality of detection elements is disposed in a predetermined direction (described below).

Figure 4:
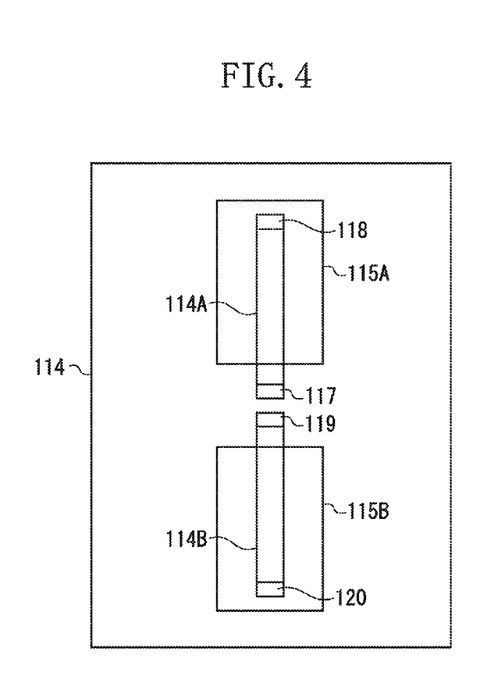
FIG. 4 is a schematic plan view illustrating positional relations between focus detection regions and optical images according to a first exemplary embodiment of the present invention.

FIG. 4 is a schematic plan view illustrating positional relations between the focus detection regions 114A and 114B and optical images 115A and 115B according to the present exemplary embodiment. The focus detection regions 114A and 114B extend in the division direction of the light flux that has passed through the imaging lens 10. The optical image 115A is an optical image that penetrated the image reforming lens unit 113A illustrated in FIG. 3A. The optical image 115B is an optical image that penetrated the image reforming lens unit 113B. The focus detection region 114A is referred to as a first focus detection region, and the focus detection region 114B is referred to as a second focus detection region. The optical image 115A is referred to as a first optical image, and the optical image 115B is referred to as a second optical image.

When storing data indicating effective ranges of the focus detection regions 114A and 114B in the storage unit of the control unit 80, it is necessary to detect positions of the optical images 115A and 115B relative to the focus detection regions 114A and 114B, respectively. To detect positions of the optical images 115A and 115B relative to the focus detection regions 114A and 114B, respectively, optical image ends on both sides of the optical images 115A and 115B are generally detected. In such a case, however, it is necessary to extend the focus detection regions 114A and 114B to the outside of the optical images 115A and 115B, respectively, thereby resulting in an increase in size of a focal detection sensor.

Figure 5:
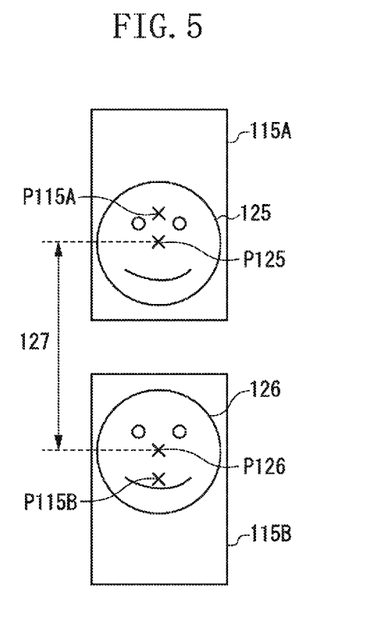
FIG. 5 is a schematic plan view illustrating a positional relation between subject images in each optical image according to the first and a second exemplary embodiment of the present invention.

FIG. 5 is a schematic plan view illustrating a positional relation between subject images 125 and 126 in the optical images 115A and 115B, respectively, according to the present exemplary embodiment. Referring to FIG. 5, a point P115A indicates the center of the optical image 115A, and a point P115B indicates the center of the optical image 115B. Further, a point P125 indicates the center of the subject image 125, and a point P126 indicates the center of the subject image 126. A distance 127 between the points P125 and P126 is equivalent to a distance between the subject images 125 and 126 in the in-focus state.

As illustrated in FIGS. 2 and 3A, in a case where the viewing field mask 110 is disposed at a posterior position of the expected imaging surface 11 of the imaging lens 10, the subject image 125 in the optical image 115A is formed more on the side of the optical image 115B than the center of the optical image 115A. The subject image 126 in the optical image 115B is formed more on the side of the optical image 115A than the center of the optical image 115B. More specifically, focus detection is possible even though the focus detection region 114A is extended more on the side of the optical image 115B than the center of the optical image 115A, and the focus detection region 114B is extended more on the side of the optical image 115A than the center of the optical image 115B, as illustrated in FIG. 4.

Figure 6:
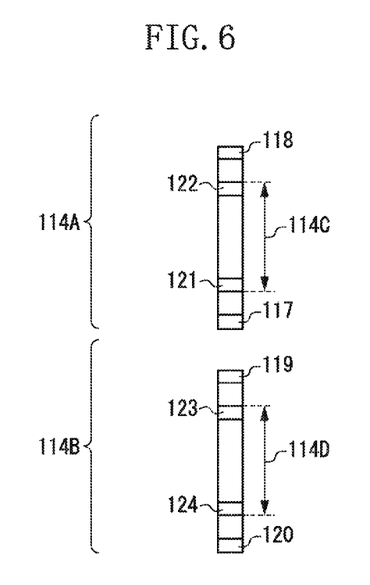
FIG. 6 is a detailed plan view illustrating focus detection regions according to the first to a third exemplary embodiment of the present invention.

FIG. 6 is a detailed plan view illustrating the focus detection regions 114A and 114B according to the present exemplary embodiment. FIG. 6 illustrates termination pixels 117 and 118, an effective range 114C, and effective pixel ends 121 and 122 in the focus detection region 114A. In the focus detection region 114A, a termination pixel closer to the focus detection region 114B is the termination pixel 117, and a termination pixel on the opposite side is the termination pixel 118. In the effective range 114C, an effective pixel end closer to the focus detection region 114B is the first effective pixel end 121, and an effective pixel end on the opposite side is the second effective pixel end 122.

FIG. 6 also illustrates termination pixels 119 and 120, an effective range 114D, and effective pixel ends 123 and 124 in the focus detection region 114B. In the focus detection region 114B, a termination pixel closer to the focus detection region 114A is the termination pixel 119, and a termination pixel on the opposite side is the termination pixel 120. In the focus detection region 114B, an effective pixel end closer to the focus detection region 114A is the third effective pixel end 123, and an effective pixel end on the opposite side is the fourth effective pixel end 124. According to the present exemplary embodiment, in the focus detection region 114A, the termination pixel 117 is referred to as a first termination pixel, and the termination pixel 118 is referred to as a second termination pixel. In the focus detection region 114B, the termination pixel 119 is referred to as a third termination pixel, and the termination pixel 120 is referred to as a fourth termination pixel.

Referring to positional relations between the focus detection regions 114A and 114B and the optical images 115A and 115B, respectively, the first termination pixel 117 is located outside the optical image 115A, as illustrated in FIG. 4. Therefore, the first effective pixel end 121 can be determined by detecting an end of the optical image 115A in the focus detection region 114A. The third termination pixel 119 is located outside the optical image 115B. Therefore, the third effective pixel end 123 can be determined by detecting an end of the optical image 115B in the focus detection region 114B.

The fourth effective pixel end 124 is a pixel located at a region apart from the first effective pixel end 121 by the distance 127 between the subject images 125 and 126. The effective pixel ends 121 and 124 are used to detect an identical region of the subject. The second effective pixel end 122 is a pixel located at a region apart from the third effective pixel end 123 by the distance 127 between the subject images 125 and 126. The effective pixel ends 123 and 122 are used to detect an identical region of the subject. In such a case, the distance 127 between the subject images 125 and 126 can be calculated based on design values of the focus detection apparatus 100.

Thus, the effective ranges 114C and 114D can be determined without detecting optical image ends on both sides of the optical images 115A and 115B, respectively. Therefore, even though the termination pixel 118 is located inside the optical image 115A, and the termination pixel 120 is located inside the optical image 115B, the effective ranges 114C and 114D can be suitably determined.

Since position data of the effective ranges 114C and 114D is stored in the storage unit as adjustment values, the control unit 80 can use information of the optical images 115A and 115B formed on the focus detection element 114 for focus detection to a maximum extent. Thus, focus detection in a wide field of view is achieved. The position data of the effective ranges 114C and 114D is stored in the storage unit as adjustment values, for example, in the production process. Then, the control unit obtains the adjustment values from the storage unit before performing focus detection.

According to the present exemplary embodiment, it is possible to achieve focus detection in a wide field of view while avoiding detection accuracy degradation and size increase.

A second exemplary embodiment of the present invention will be described below. The basic configuration of a focus detection apparatus according to the second exemplary embodiment is similar to that according to the first exemplary embodiment, and detailed description of each unit will be omitted. In the following descriptions, the above-described reference numerals will be used. Such omission of descriptions also applies to the exemplary embodiments described below.

The following describes arrangements of the focus detection regions 114A and 114B and the optical images 115A and 115B, which are differences of the present exemplary embodiment from the first exemplary embodiment.

Figure 7:
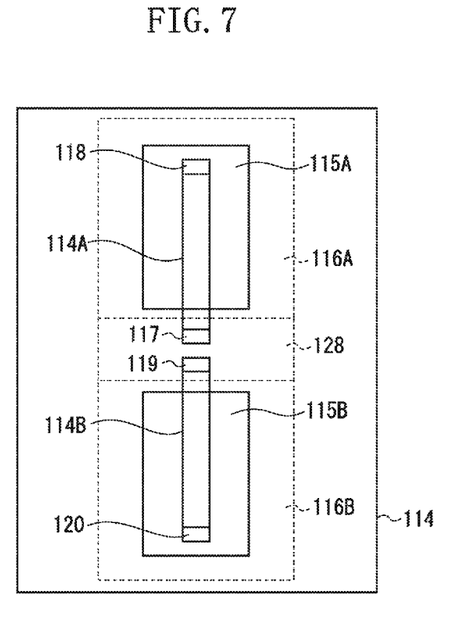
FIG. 7 is a schematic plan view illustrating positional relations between focus detection regions and optical images according to the second exemplary embodiment of the present invention.

FIG. 7 is a schematic plan view illustrating positional relations between the focus detection regions 114A and 114B and the optical images 115A and 115B according to the present exemplary embodiment. Regions 116A and 116B are defocused regions by the viewing field mask 110 formed when the viewing field mask 110 is disposed at a plane different from the expected imaging surface 11 of the imaging lens 10. The defocused regions 116A and 116B partially overlap with each other to form an overlapped region 128. The defocused region 116A is a first defocused region located so as to include the outer circumference portion of the optical image 115A. The defocused region 116B is a second defocused region located so as to include the outer circumference portion of the optical image 115B.

Both the termination pixels 117 and 119 are located in the overlapped region 128. The termination pixel 118 is located inside the optical image 115A. The termination pixel 120 is located inside the optical image 115B. The termination pixel 117 is located in the overlapped region 128. Therefore, when the subject is a uniform luminance surface, for example, the overlapped region 128, the defocused region 116A, and the optical image 115A can be distinguished in the focus detection region 114A based on the light intensity. Thus, the effective pixel end 121 can be determined. The termination pixel 119 is located in the overlapped region 128. Therefore, when the subject is a uniform luminance surface, for example, the overlapped region 128, the defocused region 116B, and the optical image 115B can be distinguished in the focus detection region 114B based on the light intensity. Thus, the effective pixel end 123 can be determined. Similar to the first exemplary embodiment, the effective pixel ends 121 and 124 are used to detect an identical region of the subject, and the effective pixel ends 122 and 123 are used to detect an identical region of the subject.

According to the present exemplary embodiment, similar to the first exemplary embodiment, the effective ranges 114C and 114D can be determined without detecting optical image ends on both sides of the optical images 115A and 115B, respectively. Therefore, even though the termination pixel 118 is located inside the optical image 115A and the termination pixel 120 is located inside the optical image 115B, the effective ranges 114C and 114D can be suitably determined. The overlapped region 128 can be suitably excluded from the effective ranges 114C and 114D by detecting the light intensity in the defocused regions 116A and 116B and the overlapped region 128, respectively. Thus, focus detection in a wide field of view can be achieved while avoiding detection accuracy degradation and size increase.

A third exemplary embodiment of the present invention will be described below. The basic configuration of the focus detection apparatus according to the present exemplary embodiment is similar to that of the first exemplary embodiment. The following describes arrangements of the focus detection regions 114A and 114B and the optical images 115A and 115B, which are differences of the present exemplary embodiment from the first exemplary embodiment.

Figure 8:
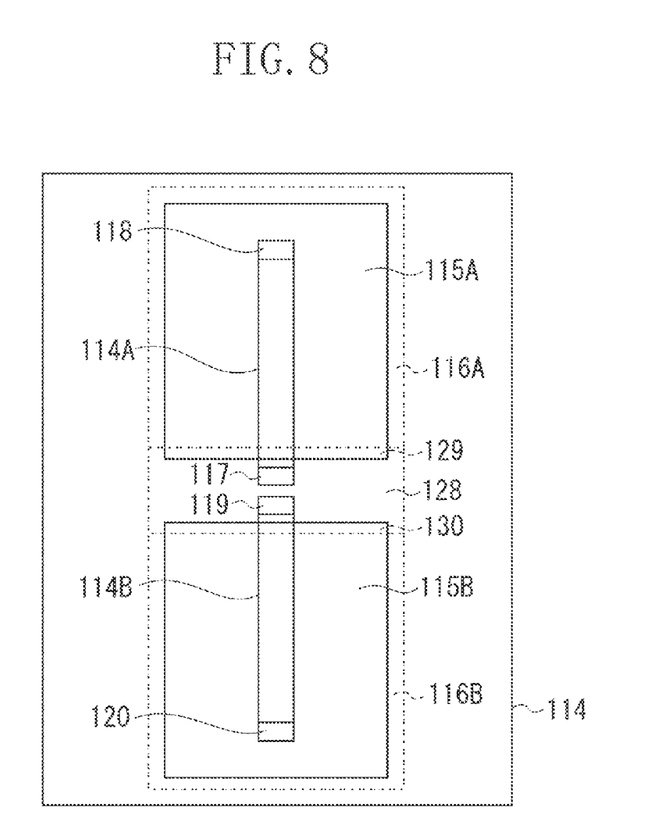
FIG. 8 is a schematic plan view illustrating positional relations between focus detection regions and optical images according to the third exemplary embodiment of the present invention.

FIG. 8 is a schematic plan view illustrating positional relations between the focus detection regions 114A and 114B and the optical images 115A and 115B according to the present exemplary embodiment. The regions 116A and 116B are defocused regions by the viewing field mask 110 formed when the viewing field mask 110 is disposed at a plane different from the expected imaging surface 11 of the imaging lens 10. The optical images 115A and 115B overlap with each other to form an overlapped region 128. The optical image 115A and the defocused region 116B overlap with each other to form an overlapped region 129. The optical image 115B and the defocused region 116A overlap with each other to form an overlapped region 130. The defocused region 116A is a first defocused region located so as to include the outer circumference portion of the optical image 115A. The defocused region 116B is a second defocused region located so as to include the outer circumference portion of the optical image 115B.

The termination pixels 117 and 119 are located in the overlapped region 128. The termination pixel 118 is located inside the optical image 115A. The termination pixel 120 is located inside the optical image 115B. The termination pixel 117 is located inside the overlapped region 128, and therefore, when the subject is a uniform luminance surface, for example, the overlapped region 128, the overlapped region 129, and the optical image 115A can be distinguished in the focus detection region 114A based on the light intensity. Thus, the effective pixel end 121 can be determined. The termination pixel 119 is located inside the overlapped region 128, and therefore, when the subject is a uniform luminance surface, for example, the overlapped region 128, the overlapped region 130, and the optical image 115B can be distinguished in the focus detection region 114B based on the light intensity. Thus, the effective pixel end 123 can be determined.

According to the present exemplary embodiment, similar to the first exemplary embodiment, the effective ranges 114C and 114D can be determined without detecting optical image ends on both sides of the optical images 115A and 115B, respectively. Therefore, even though the termination pixel 118 is located inside the optical image 115A and the termination pixel 120 is located inside the optical image 115B, the effective ranges 114C and 114D, respectively, can be suitably determined. The overlapped regions 128, 129, and 130 can be suitably excluded from the effective ranges 114C and 114D by detecting the light intensity in the overlapped regions 128, 129, and 130. Thus, focus detection in a wide field of view can be achieved while detection accuracy degradation and size increase are avoided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-008571 filed Jan. 21, 2014, which is hereby incorporated by reference herein in its entirety.

What is claimed is:

1. A focus detection apparatus comprising:
a viewing field mask;
an image reforming lens unit including a pair of lens portions corresponding to a pair of opening portions in the viewing field mask; and
a detection element including a plurality of pixels and a pair of detection regions each for detecting different one of parallax optical images, wherein each of the parallax optical images is passed through the pair of lens portions of the image reforming lens unit respectively,
wherein each of the plurality of focus detection regions includes a termination pixel located outside the parallax image to be detected and a termination pixel located inside the parallax optical image to be detected.

2. The focus detection apparatus according to claim 1, wherein the viewing field mask disposed more on a side of the focus detection element than an expected imaging surface of the imaging optical system determines contours of a first optical image and a second optical image to be formed.

3. The focus detection apparatus according to claim 2, wherein the focus detection element includes a first focal detection region for detecting the first optical image, in which a first termination pixel disposed on a side of a second focus detection region is located outside the first optical image, and a second termination pixel disposed on a side opposite to the second focus detection region is located inside the first optical image, and
wherein the focus detection element includes the second focus detection region for detecting the second optical image, in which a third termination pixel disposed on a side of the first focus detection region is located outside the second optical image, and a fourth termination pixel disposed on a side opposite to the first focus detection region is located inside the second optical image.

4. The focus detection apparatus according to claim 3, wherein the memory stores data indicating a position of an effective range in the first focus detection region, and data indicating a position of an effective range in the second focus detection region, as adjustment values, and
wherein, based on the adjustment values obtained from the memory unit, the control unit detects a focus state of the imaging optical system from signals detected in the effective ranges of the first and the second focus detection regions by the focus detecting element, and controls focus adjustment.

5. The focus detection apparatus according to claim 4, wherein the first and the third termination pixels are disposed in an overlapped region where the first and the second optical images are overlapped with each other.

6. The focus detection apparatus according to claim 4, wherein the first and the third termination pixels are disposed in an overlapped region where a first defocused region located outside the first optical image and a second defocused region located outside the second optical image are overlapped with each other.

7. The focus detection apparatus according to claim 4,
wherein the control unit obtains the adjustment values from the storage unit,
wherein the control unit determines a first effective pixel end located on the side of the second focus detection region in the first focus detection region, and a fourth effective pixel end located on the side opposite to the first focus detection region in the second focus detection region, and
wherein the control unit determines a third effective pixel end located on the side of the first focus detection region in the second focus detection region, and a second effective pixel end located on the side opposite to the second focus detection region in the first focus detection region.

8. The focus detection apparatus according to claim 7, wherein the focus detection element detects an identical region of a subject at the first and the fourth effective pixel ends, and detects an identical region of the subject at the second and the third effective pixel ends.

9. The focus detection apparatus according to claim 4, wherein the first and the second focus detection regions extend along a division direction of a light flux that has passed through the imaging optical system.

10. The focus detection apparatus according to claim 1, further comprising:
a control unit configured to, based on adjustment values obtained from a memory for storing data indicating positions of effective ranges in the plurality of focus detection regions as adjustment values, detect a focusing state of an imaging optical system from signals detected in the plurality of focus detection regions by the focus detection element, and control focus adjustment.

* * * * *